United States Patent [19]

Argoudelis et al.

[11] 3,923,602

[45] Dec. 2, 1975

[54] COMPOSITION OF MATTER AND PROCESS

[75] Inventors: Alexander D. Argoudelis, Portage; John H. Coats; LeRoy E. Johnson, both of Kalamazoo, all of Mich.

[73] Assignee: The Upjohn Company, Kalamazoo, Mich.

[22] Filed: Jan. 31, 1975

[21] Appl. No.: 545,734

Related U.S. Application Data

[60] Division of Ser. No. 409,402, Oct. 25, 1973, which is a continuation-in-part of Ser. No. 370,351, June 15, 1973.

[52] U.S. Cl. ............................................. 195/80 R
[51] Int. Cl.² ........................................... C12D 9/00
[58] Field of Search .................................. 195/80 R

[56]        References Cited
       UNITED STATES PATENTS 3,812,096   5/1974   Argoudelis et al. ............... 195/80 R
3,817,979   6/1974   Argoudelis et al. ............... 195/80 R

*Primary Examiner*—A. Louis Monacell
*Assistant Examiner*—Robert J. Warden
*Attorney, Agent, or Firm*—Roman Saliwanchik

[57]              ABSTRACT

Microbiological processes for preparing new celestosaminide antibiotics by using the microorganism *Streptomyces caelestis*, NRRL 2418, and disclosed mutants *Streptomyces caelestis* mutant 22227a, NRRL 5320, and *Streptomyces caelestis* mutant 22218a, NRRL 5481.

22 Claims, No Drawings

COMPOSITION OF MATTER AND PROCESS

CROSS REFERENCE TO RELATED APPLICATION

The application is a division of co-pending application Ser. No. 409,402, filed on Oct. 25, 1973, which was a continuation-in-part of pending application Ser. No. 370,351, filed on June 15, 1973.

BACKGROUND OF THE INVENTION

Celesticetin is an antibacterially active compound which is disclosed in U.S. Pat. No. 2,928,844. In can be represented by the following structural formula:

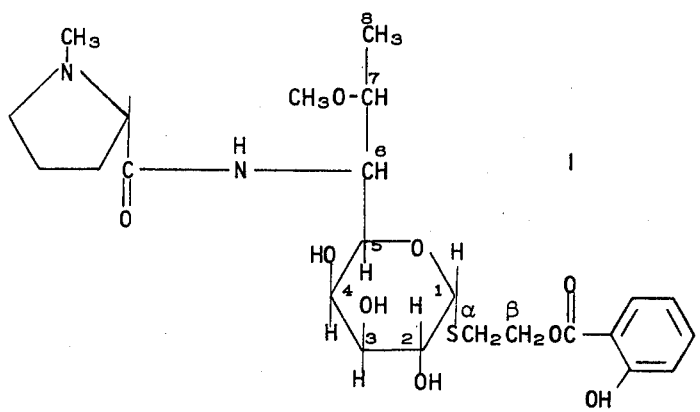

Celesticetin can be hydrolyzed according to the process disclosed in U.S. Pat. No. 2,851,463 to produce the compound desalicetin which can be represented by the following structural formula:

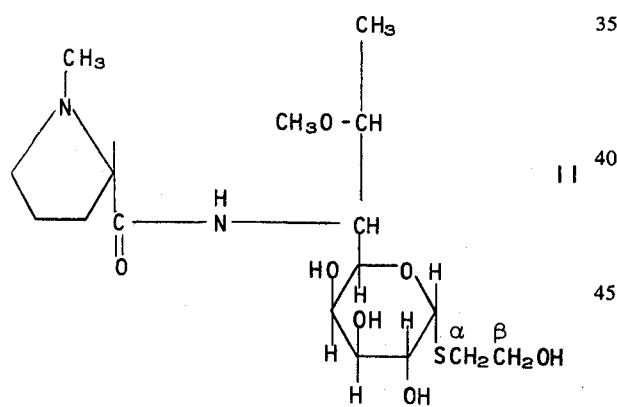

BRIEF SUMMARY OF THE INVENTION

The process of the subject invention comprise the addition of various carboxylic acids to (1) a *Streptomyces caelestis*, NRRL 2418 fermentation to prepare new antibiotics of Formula III which can be called desalicetin β-acylates:

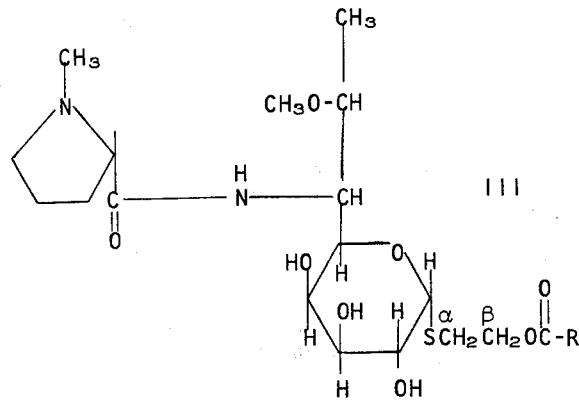

2. a *Streptomyces caelestis* mutant 22227a, NRRL 5320 fermentation to prepare new antibiotics of Formula IV:

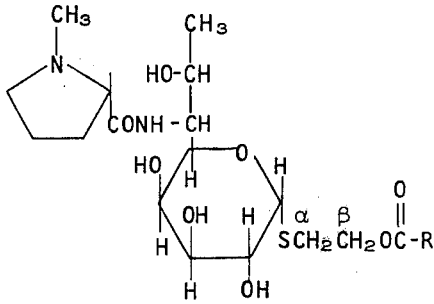

and, (3) a *Streptomyces caelestis* mutant 222218a, NRRL 5481 fermentation to prepare new antibiotics of Formulae V and VI:

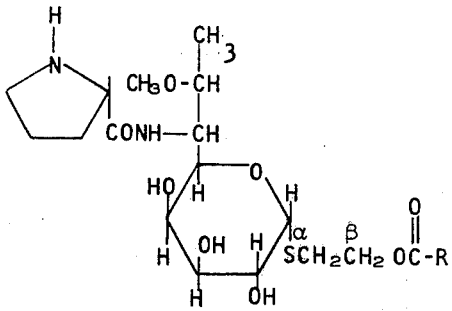

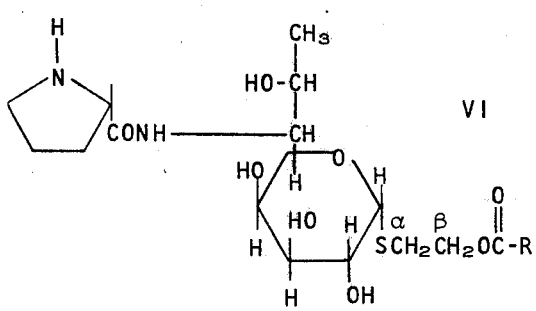

wherein R in Formulae III, IV, V, and Vi is selected from the group consisting of alkyl or alkylene of up to 12 carbon atoms; substituted alkyl or alkylene wherein the alkyl or alkylene is of up to 12 carbon atoms and the substitution group is selected from the group consisting of —OH, OR' (wherein R' is alkyl of not more than 8 carbon atoms throughout this disclosure), —NH₂, —NHR', —NO₂, —SO₃H, —SO₂NH₂, —COOH, Cl, Br, I, F, —SH, and SR'; and

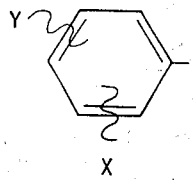

wherein x and Y are selected from the group consisting of H, R', —OH, —OCH₃, OR', —NH₂, NHR', NO, NO₂, —CHO, —CH, —COOH, —CH₂OH, —SO₃H, —SO₂NH₂, Cl, Br, I, F, —SH, and SR' with the understanding that X and Y can be the same or different.

The carboxylic acids which can be employed in the process are saturated and unsaturated, substituted and unsubstituted aliphatic acids of from 2 to 12 carbon atoms, inclusive; substitutions of the aliphatic acids can be —OH, OR' (R' = alkyl of not more than 8 carbon atoms), —NH₂, —NHR', —NO₂, —SO₃H, —COOH, Cl, F, Br, I, —SH, SR', and monosubstituted and disubstituted aromatic acids of the general formula

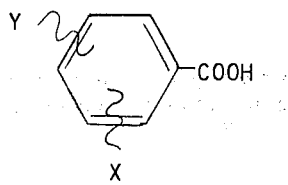

wherein X and Y are selected from the group consisting of R', —OH, —OCH₃, OR', NH₂, NHR', NO, NO₂, —CHO, —CN, —COOH, —CH₂OH, —SO₃H, —SO₂NH₂, Cl, F, Br, I, —SH, and —SR'.

The above carboxylic acids can be added to fermentations using the microorganisms disclosed herein. These acids can be added to the fermentation at the beginning of the fermentation cycle and by increments during the fermentation cycle. Preferably, the acids are added to the fermentation after a suitable amount of growth of the microorganism has been obtained. An effective level of carboxylic acid, as disclosed above, can vary from about 0.5 gms. to about 5 gms. per liter of fermentation medium.

DETAILED DESCRIPTION

The antibiotics of the subject invention are prepared by adding various carboxylic acids, as disclosed herein, to a fermentation medium such as disclosed in U.S. Pat. No. 2,928,844. The acids can be added to the fermentation conveniently at any time after inoculation or at intervals during the course of the fermentation. In any event, it is desirable to add the carboxylic acids to the fermentation beer as soon as a significant amount of microorganism growth has been established.

The processes of the subject invention can be conducted with variants and/or mutants of the microorganism *Streptomyces caelestis* which has been given the repository designation NRRL 2418. The only requisite is that the variant and/or mutant is capable of producing a celesticetin antibiotic.

Mutants of *Streptomyces caelestis* which exemplify the subject invention are *Streptomyces caelestis* mutant 22227a, NRRL 5320, and *Streptomyces caelestis* mutant 22218a, NRRL 5481.

*Streptomyces caelestis*, NRRL 2418, is available upon request from the Northern Regional Research Laboratories, Agricultural Research Services, U.S. Department of Agriculture, Peoria, Illinois, U.S.A.

The taxonomic characterization of NRRL 2418 in U.S. Pat. No. 2,928,844 is incorporated herein by reference to said patent.

The taxonomy of *Streptomyces caelestis* mutant 22227a, is disclosed in Belgium Pat. No. 793,630 and is incorporated herein by reference to said patent. The taxonomy of *Streptomyces caelestis* mutant 22218a, NRRL 5481, is disclosed in pending application Ser. No. 261,724, filed on June. 12, 1972, and is incorporated herein by reference to said application. These microorganisms are available upon request from the Northern Regional Research Laboratories, Agricultural Research Services, U.S. Department of Agriculture, Peoria, Illinois, U.S.A.

The effective amount of the carboxylic acid which can be added to the above *Streptomyces caelestis* fermentations to produce the desired new antibiotics can be varied from about 0.5 gms. to about 5 gms. per liter of fermentation medium.

The antibiotics are produced in a aqueous nutrient medium under submerged aerobic conditions. It is to be understood also that for the preparation of limited amounts, surface cultures and bottles can be employed. The organism is grown in a nutrient medium containing a carbon source, for example an assimilable carbohydrate, and a nitrogen source, for example an assimilable nitrogen compound or proteinaceous material. Preferred carbon sources include glucose, brown sugar, sucrose, glycerol, starch, cornstarch, lactose, dextrin, molasses, and the like. Preferred nitrogen sources include corn steep liquour, yeast, autolyzed brewer's yeast with milk solids, soybean meal, cottonseed meal, cornmeal, milk solids, pancreatic digest of casein, distillers' solids, animal peptone liquors, fishmeal, meat and bone scraps, and the like. Combinations of these carbon and nitrogen sources can be used advantageously. Trace metals, for example zinc, magnesium, manganese, cobalt, iron, and the like, usually need not be added to the fermentation media since tap water and unpurified ingredients are used as media components.

The processes of the subject invention can be effected, advantageously, at a temperature of about 18° C. to 40° C., and preferably at about 28° C. to 30° C. Ordinarily, optimum production of the desired antibiotic is obtained in about two to ten days fermentation time. The medium normally remains basic during the fermentation. The final pH is dependent, in part, on the buffers present, if any, and in part on the initial pH of the culture medium.

When growth is carried out in large vessels and tanks, it is preferable to use the vegetative form, rather than the spore form, of the microorganism for inoculation to avoid a pronounced lag in the production of the antibiotic and the attendant inefficient utilization of the equipment. Accordingly, it is desirable to produce a vegetative inoculum in a nutrient broth culture by innoculating this broth culture with an aliquot from a soil or a slant culture. When a young, active vegetative inoculum has thus been secured, it is transferred aseptically to large vessels or tanks. The medium in which the vegetative inoculum is produced can be the same as, or different from, that utilized for the production of the antibiotic, as long as it is such that a good growth of the microorganism is obtained.

The antibiotics produced by the invention processes can be recovered from the fermentation beer by a variety of recovery techniques, for example, filtration, absorption on a resin which comprises a non-ionic macroporous copolymer of styrene cross-linked with divinylbenzene, and counter double current distribution with a suitable solvent system, for example 1-butanol and water. The desired antibiotics can be separated from concurrently produced celesticetin by the use of silica gel chromatography.

In a preferred recovery process, the new antibiotic is recovered from the culture medium by separation of the mycelia and undissolved solids by conventional means, such as by filtration and centrifugation. The desired antibiotic, along with any celesticetin antibiotic, i.e., celesticetin, or 7-O-demethylcelesticetin or N-demethylcelesticetin, or N-demethyl-7-O-demethylcelesticetin which is produced, is then recovered from the filtered or centrifuged broth by passing said broth over a resin which comprises a nonionic macroporous copolymer of styrene cross-linked with divinylbenzene. Resins of this type are disclosed in U.S. Pat. No. 3,515,717. Exemplary of this type of resin is Amberlite XAD-2. The new antibiotic and celesticetin antibiotic are eluted from the resin with a suitable solvent, for example methanol-water (95:5 v/v). Bioactive eluate fractions are determined by a standard microbiological disc plate assay using the microorganism *Streptomyces lutea*. Biologically active fractions are combined, and concentrated to dryness. Further recovery of the new antibiotic proceeds by subjecting this dry concentrate, containing the desired antibiotic and some celesticetin antibiotic, to counter double current distribution employing a suitable solvent system, for example, one consisting of an equal volume of 1-butanol and water. Fractions are collected and tested for bioactivity against *S. lutia*, as described above. Further, thin layer chromatography (tlc) using silica gel G and a solvent mixture consisting of chloroform-methanol (6:1 v/v) is conducted on selected fractions to identify the presence of the desired antibiotic and celesticetin antibiotic.

In a preferred separation process, celesticetin antibiotic is separated from the desired antibiotic by the use of silica gel chromatography employing a suitable solvent system, for example, one consisting of chloroform-methanol (6:1 v/v). Fractions are collected from the column and analyzed for bioactivity against *S. lutea*, as described above. Fractions which contain the desired antibiotic and no celesticetin antibiotic are concentrated to dryness. The resulting residue is dissolved in a suitable solvent, for example an equal amount of methanol and chloroform, and this solution is then mixed with ether. Methanolic HCl (1 N) is then added to the solution to precipitate the desired antibiotic as the hydrochloride. This precipitate is isolated by filtration and dried.

The new antibiotics produced by the processes of the subject invention exist either in the non-protonated (free base) form or the protonated (salt) form depending on the pH of the environment. They form stable protonates (acid addition salts) by neutralization of the free base with an acid or by metathesis between the protonated form of the antibiotic and the anion of an acid. Suitable acids for this purpose include hydrochloric, sulfuric, phosphoric, acetic, succinic, citric, lactic, maleic, fumaric, pamoic, cholic, palmitic, mucic, camphoric, glutaric, glycolic, phthalic, tartaric, lauric, stearic, salicylic, 3-phenylsalicylic, 5-phenylsalicylic, 3-methylglutaric, orthosulfobenzoic cyclohexanesulfamic, cyclopentanepropionic, 1,2-cyclohexanedicarboxylic, 4-cyclohexenecarboxylic, octadecenylsuccinic, octenylsuccinic, methanesulfonic, benzenesulfonic, helianthic, Reinecke's, azobenzenesulfonic, octadecylsulfonic, picric, and the like acids. These acid addition salts are useful in upgrading the free base.

The new antibiotics and their salts are active against various bacteria, for example, *Staphylococcus aureus* and *Streptococcus faecalis* and can be used to disinfect washed and stacked food utensils contaminated with these bacteria; they can also be used as disinfectants on various dental and medical equipment contaminated with *Staphylococcus aureus*. Further, since these antibiotics are active against *Streptococcus hemolyticus*, they can be used to disinfect instruments, utensils or surfaces where the inactivation of this organism is desirable.

The following examples are illustrative of the processes of the present invention, but are not to be construed as limiting. All percentages are by weight and all solvent mixture proportions are by volume unless otherwise noted.

EXAMPLE 1 - Desalicetin $\beta$-(4-aminosalicylate)
-Formula III

Part A. FERMENTATION

A soil stock of *Streptomyces caelestis*, NRRL 2418, is used to inoculate a series of 500 ml. Erlenmeyer flasks each containing 100 ml. of sterile seed medium consisting of the following ingredients:

| | |
|---|---|
| Glucose monohydrate | 10 gms./liter |
| Bacto peptone (Difco) | 10 gms./liter |
| Bacto yeast extract (Difco) | 2.5 gms./liter |
| Deionized water, pH is unadjusted | Balance |
| Three drops of lard oil is added per flask for defoaming purposes. | |

The flasks are incubated for 96 hours at 28° C. on a Gump rotary shaker operating at 250 rpm.

A 5 percent inoculum of the seed described above (5 ml.) is added to each of a series of plain 500 ml. Erlenmeyer flasks, each containing 100 ml. of the following sterile fermentation medium:

| | |
|---|---|
| Glucose monohydrate | 45 gms./liter |
| Buffalo starch* | 40 gms./liter |
| Black strap molasses | 20 gms./liter |
| Calcium carbonate | 8 gms./liter |
| Potassium sulfate | 2 gms./liter |
| Peptone (Wilson's s.p.), granular** | 25 gms./liter |
| Tap water q.s. | Balance |

*Corn Industrial - Division of Corn Products Company International, Englewood, New Jersey
**Wilson Protein Technology - Division of Wilson Pharmaceutical and Chemical Corp., Chicago, Illinois The pH of the fermentation medium is adjusted to 7.2 with an aqueous solution of sodium hydroxide before sterilization.

The inoculated fermentation flasks, described above, are incubated for 24 hours at a temperature of 28° C. on a Gump rotary shaker operating at 250 rpm. After 24 hours, 4-aminosalicylic acid is added to each flask at a level of 2 gms./liter of fermentation medium. The flasks are then reincubated on the rotary shaker.

Part B. RECOVERY

Fermentation beer (approximately 10 liters), obtained as described above, is harvested at 72 hours and filtered using diatomaceous earth as a filter aid. The filter cake is washed with 2 liters of water. The wash is combined with the clear filtrate and this solution is passed over a column containing 5 ml. of Amberlite XAD-2 at a flow rate of 40 ml. per minute. The spent beer is collected as one fraction (spent). The column is then washed with 2 liters of water (wash) and eluted with methanol-water (95:5 v/v). Fractions of 20 ml. are collected. Selected fractions are tested for bioactivity using sensitive *S. lutea* (ATCC 9341) as the assay organism. Results follow:

|  | Zone (mm) |
|---|---|
| Clear beer-wash | 32 |
| Spent | 12 |
| Wash | 0 |
| Fraction No. (95% MeOH) | |
| 2 | 0 |
| 4 | 0 |
| 6 | 0 |
| 8 | 0 |
| 10 | 0 |
| 12 | traces |
| 14 | 31 |
| 16 | 41 |
| 18 | 41 |
| 20 | 42 |
| 22 | 40 |
| 24 | 39 |
| 26 | 40 |
| 28 | 39 |
| 30 | 38 |
| 35 | 35 |
| 40 | 32 |
| 45 | 29 |
| 50 | 26 |
| 55 | 22 |
| 60 | 19 |
| 65 | 16 |
| 70 | 14.5 |
| 75 | 14 |
| 80 | 13 |
| 85 | 10 |
| 90 | 11 |
| 95 | 10 |
| 100 | 9 |
| 105 | 10 |
| 110 | 10 |
| 115 | traces |
| 120 | " |
| 125 | " |

Fractions 13–50 are combined and concentrated to dryness to give Preparation A (10.2 gms.). Fractions 51–150 are also combined and concentrated to dryness to give Preparation B (1.5 gms.). Tlc analyses of both preparations show identical antibiotic composition in that both contain celesticetin and desalicetin β-(4-aminosalicylate). The two preparations are combined to give Preparation C (11.7 gms.).

Part C. COUNTER DOUBLE CURRENT DISTRIBUTION

Preparation C (11.7 gms.), obtained as described above, is dissolved in 100 ml. of the lower phase of a solvent system consisting of equal volumes of 1-butanol and water. The pH of the solution is adjusted to 3.5 using 2 N aqueous hydrochloric acid. The solution is then added to tubes 29 and 30 located in the area where the lower phase enters the 100 tube, all glass counter current distribution machine. The following distributions are run:

a. 20, without collecting fractions
b. 58, collecting upper phase only
c. 100, collecting both phases Fractions of 20 ml. are collected. Fractions are tested for bioactivity against sensitive *S. lutea*. Results follow:

| Lower Collector Fraction No. | Zone (mm) | Lower Collector Fraction No. | Zone (mm) |
|---|---|---|---|
| 0 |  | 55 | 35 |
| 5 | 0 | 60 | 37 |
| 10 | 0 | 65 | 37 |
| 15 | 10 | 70 | 36 |
| 20 | 14 | 75 | 36 |
| 25 | 18 | 80 | 34 |
| 30 | 20 | 85 | 35 |
| 35 | 20 | 90 | 35 |
| 40 | 21 | 95 | 35 |
| 45 | 23 | 100 | 37 |
| 50 | 31 |  |  |

| Lower Machine Fraction No. | Zone (mm) | Upper Machine Fraction No. | Zone (mm) |
|---|---|---|---|
| 50 | 35 | 5 | 27 |
| 45 | 36 | 10 | 26 |
| 40 | 37 | 15 | 25 |
| 35 | 37 | 20 | 23 |
| 30 | 37 | 25 | 21 |
| 25 | 36 | 30 | 20 |
| 20 | 34 | 35 | 18 |
| 15 | 32 | 40 | 17 |
| 10 | 31 | 45 | 13 |
| 5 | 31 | 50 | 0 |
| 0 | 30 |  |  |

| Upper Collector Fraction No. | Zone (mm) | Upper Collector Fraction No. | Zone (mm) |
|---|---|---|---|
| 158 | 0 | 70 | 16.5 |
| 155 | 0 | 65 | 17 |
| 50 | 0 | 60 | 17.5 |
| 45 | 0 | 55 | 17.5 |
| 40 | 0 | 50 | 21 |
| 35 | 0 | 45 | 20 |
| 30 | 0 | 40 | 21 |
| 25 | 0 | 35 | 20 |
| 20 | 0 | 30 | 21 |
| 15 | 0 | 25 | 20 |
| 10 | traces | 20 | 21 |
| 5 | 12 | 15 | 22 |
| 100 | 11 | 10 | 23 |
| 95 | 13 | 5 | 22 |
| 90 | 12 | 0 | 0 |
| 85 | 13 |  |  |
| 80 | 15 |  |  |
| 75 | 16 |  |  |

Thin layer chromatograms are run on selected fractions. The following pools are made on the basis of the spotting and tlc results. Each pool is concentrated to dryness to give the following preparations:

Pool I, lower collector 15–45 (Preparation D, 4.6 gms.)

Pool II, lower collector 50–100 and lower machine 50–40 (Preparation E, 1.5 gms.)

Pool III, lower machine 39–0 and upper machine 1–45 (Preparation F, 7.3 gms.)

Pool IV, upper collector 5–14 (Preparation G, 1.8 gms.)

Pool V, upper collector 15–100 (Preparation H, 1.0 gm.)

Tlc analysis shows that Preparation D contains small amounts of activity, and, therefore, is discarded. Preparation E contains both celesticetin and desalicetin β-(4-aminosalicylate). Tlc analysis shows that Preparations F, G, and H do not contain desalicetin β-(4-aminosalicylate).

Part D. SEPARATION OF CELESTICETIN AND DESALICETIN β-(4-AMINOSALICYLATE) BY SILICA GEL CHROMATOGRAPHY A suitable column is prepared from 500 gms. of silica gel (Merck-Darmstadt, 7734) packed in the solvent system consisting of chloroform-methanol (6:1 v/v). The starting material, Preparation E (1.5 gms.), obtained as described above, is dissolved in 50 ml. of the solvent system, the solution is mixed with 30 gms. of silica gel, and the mixture is concentrated to dryness in vacuo. The resulting powder is then added on the top of the column and the column is eluted with the above solvent system. Fractions of 20 ml. are collected and analyzed for bioactivity against sensitive *S. lutea*. Thin layer chromatograms of bioactive fractions are also run. Results follow: j

| Fraction No. | Zone (mm) |
|---|---|
| 10 | 0 |
| . | . |
| . | . |
| . | . |
| 200 | 0 |
| 210 | 27 |
| 220 | 32 |
| 230 | 32 |
| 240 | 31 |
| 250 | 31.5 |
| | 31 |
| 260 | |
| 270 | 30 |
| 280 | 30 |
| 290 | 29 |
| 300 | 27 |
| 310 | 27 |
| 320 | 27 |
| 330 | 25 |
| 340 | 24 |
| 350 | 23 |
| 360 | 22 |
| 370 | 22 |
| 380 | 20 |
| 390 | 20.5 |
| 400 | 19 |
| 410 | 19 |
| 420 | 19 |
| 430 | 18 |
| 440 | 17 |
| 450 | 17 |
| 460 | 15.5 |
| 470 | 15 |
| 480 | 15 |
| 490 | 15 |
| 500 | 16 |
| 510 | 16 |
| 520 | 14.5 |
| 530 | 16 |
| 540 | 16 |
| 550 | 16 |
| 560 | 16.5 |
| 570 | 16.5 |
| 580 | 17 |
| 590 | 20 |
| 600 | 28 |
| 610 | 29 |
| 620 | 30 |
| 630 | 30 |
| 640 | 30 |
| 650 | 30 |
| 660 | 30 |
| 670 | 30 |
| 680 | 30 |
| 690 | 29 |
| 700 | 28 |
| 710 | 28 |
| 720 | 28 |
| 730 | 27 |
| 740 | 27 |
| 750 | 27 |
| 760 | 27 |
| 770 | 27 |
| 780 | 27 |
| 790 | 27 |
| 800 | 27 |
| 810 | 27 |
| 820 | 26 |

-continued

| Fraction No. | Zone (mm) |
|---|---|
| 830 | 26 |
| 840 | 26 |
| 850 | 26 |
| 860 | 26 |
| 870 | 26 |
| 880 | 26 |
| 890 | 26 |
| 900 | 26 |
| 910 | 17.5 |
| 920 | 17.5 |
| 930 | 17.5 |
| 940 | 17.5 |
| 950 | 17 |
| 960 | 17 |
| 970 | 17 |
| 980 | 17 |
| 990 | 17 |
| 1000 | 16 |
| 1010 | 16 |
| 1020 | 17 |
| 1030 | 16 |
| 1040 | 16 |
| 1050 | 16 |
| 1060 | 16 |
| 1070 | 15 |
| 1080 | 15 |
| 1090 | 15 |
| 1100 | 15 |
| 1110 | 15 |
| 1120 | 15 |
| 1130 | 14 |
| 1140 | 15 |
| 1150 | 15 |
| 1160 | 15 |
| 1170 | 15 |
| 1180 | 20 |
| 1190 | 21 |
| 1200 | 21 |
| 1210 | 21 |
| 1220 | 20 |
| 1230 | 20 |
| 1240 | 20 |
| 1250 | 19 |
| 1260 | 19 |
| 1270 | 19 |
| 1280 | 20 |
| 1290 | 18.5 |
| 1300 | 18.5 |
| 1310 | 18.5 |
| 1320 | 18 |
| 1330 | 17 |
| 1340 | 18 |
| 1350 | 17 |
| 1360 | 16 |
| 1370 | 17 |
| 1380 | 17 |
| 1390 | 16 |
| 1400 | 18 |
| 1410 | 18.5 |
| 1420 | 18.5 |
| 1430 | 17.5 |
| 1440 | 17 |
| 1450 | 16 |
| 1460 | 17 |
| 1470 | 18 |
| 1480 | 17 |
| 1490 | 17.5 |
| 1500 | 17 |
| 1510 | 16 |
| 1520 | 16 |
| 1530 | 16.5 |
| 1540 | 14 |
| 1550 | 12.5 |
| 1560 | 12 |
| 1570 | 11.5 |
| 1580 | 11.5 |
| 1590 | 11 |
| 1600 | 10.5 |
| 1610 | 11 |
| 1620 | 10 |
| 1630 | 10.5 |
| 1640 | 10 |
| 1650 | 10 |

The following pools are made:
Pool I - fractions 215–525
Pool II - fractions 540–580
Pool III - fractions 590–625
Pool IV - fractions 626–1170

Pool V - fractions 1180–1650

Pool IV, which contains desalicetin β-(4-aminosalicylate) is concentrated to dryness. The resulting residue is dissolved in 10 ml. of methanol and 10 ml. of chloroform, and this solution is mixed with 500 ml. of ether. Methanolic HCl, (1 N, 5 ml.) is added to this solution. The resulting precipitated desalicetin β-(4-aminosalicylate) hydrochloride is isolated by filtration and dried; yield, 110 mg. This product has the following physical and chemical characteristics:

1. Molecular Weight and Formula (Determined by High Resolution Mass Spectroscopy) $C_{24}H_{37}N_3O_9S$; Mol. Wt. 543.2255
2. U.V. Spectrum (In Methanol)

| λmax | a | ε |
| --- | --- | --- |
| 208 | 36.47 | 12,500 |
| 240 | 13.24 | 4,550 |
| 288 | 21.32 | 7,300 |
| 306 | 26.77 | 9,200 |

3. Infrared Absorption Spectrum Band Tabulations in Mineral Oil (Nujol) Mull

| Band Frequency (cm$^{-1}$) | Intensity |
| --- | --- |
| 3360 | S |
| 3260 | S |
| 3080 | M |
| 2940 | S (N) |
| 2850 | S (N) |
| 2730 | M |
| 2610 | M |
| 1673 | S |
| 1650 | S |
| 1625 | S |
| 1565 | S |
| 1540 | M |
| 1500 | M |
| 1457 | S (N) |
| 1381 | S |
| 1375 | S (N) |
| 1330 | S |
| 1303 | S |
| 1265 | S |
| 1210 | M |
| 1152 | S |
| 1115 | S |
| 1092 | S |
| 1055 | S |
| 1005 | M |
| 982 | M |
| 968 | M |
| 925 | W |
| 900 | W |
| 862 | M |
| 793 | M |
| 737 | M (N) |
| 720 | M |
| 695 | M |

(N) = Nujol

Band Tabulations in KBr Pellet

| Band Frequency (cm$^{-1}$) | Intensity |
| --- | --- |
| 3400 | S |
| 3260 | S |
| 3080 | S |
| 2980 | S |
| 2930 | S |
| 2825 | M |
| 2600 | W |
| 2360 | W |
| 1674 | S |
| 1650 | S |
| 1625 | S |
| 1562 | S |
| 1500 | M |
| 1455 | M |
| 1450 | S |
| 1385 | S |
| 1327 | S |
| 1303 | S |
| 1265 | S |
| 1207 | M |
| 1152 | S |
| 1115 | S |
| 1088 | S |
| 1052 | S |
| 1010 | M |
| 987 | M |
| 967 | M |
| 925 | W |
| 900 | W |
| 862 | M |
| 793 | M |
| 785 | M |
| 750 | M |
| 737 | M |
| 695 | M |

Infrared band intensities as given above, are indicated as S, M, and W, respectively, and are approximated in terms of the backgrounds in the vicinity of the bands. An S band is of the same order of intensity as the strongest in the spectrum; M bands are between ⅓ and ⅔ as intense as the strongest band; and W bands are less than ⅓ as intense as the strongest band. These estimates are made on the basis of a percent transmission scale.

4. Specific Rotation $[\alpha]_D^{25}$, + 111° (c, 1, water)
5. Antibacterial Spectrum (Comparison with Celesticetin) Solutions containing desalicetin β-(4-aminosalicylate) of celesticetin are prepared at 1 mg./ml. in Brain Heart Infusion (BHI) broth. A 2-fold broth dilution assay in BHI broth is run. Incubation is at 37° C. End points are read at 20 hours. The results are as follows:

Broth Dilution Spectrum (Expressed in Micrograms per ml to Inhibit)

| Organism | Celesticetin | Desalicetin-β-(4-aminosalicylate) |
| --- | --- | --- |
| S. aureus UC 76 | 1 | 2. |
| S. aureus UC 552 | 250 | 250 |
| S. hemolyticus UC 152 | <0.5 | <0.5 |
| S. faecalis UC 3235 | 2 | 2 |
| E. coli UC 51 | >500 | >500 |
| P. vulgaris UC 93 | >500 | >500 |
| K. pneumoniae UC 57 | 500 | 500 |
| M. avium UC 159 | 2 | 1 |
| Ps. aeruginosa UC 95 | >500 | >500 |
| B. subtilis UC 564 | 1 | 4 |
| D. pneumoniae UC 41 | 1 | <0.5 |
| S. Lutea UC 130 | 1 | <0.5 |

The "UC" appearing after the microorganism name refers to the Upjohn Company culture collection.

Desalicetin β-(4-aminosalicylate) hydrochloride can be converted to the free base by dissolving it in 1-butanol-water (1:1) and neutralizing the solution with a suitable base, for example, sodium hydroxide, to a pH greater than pH 7.5, advantageously to a pH from 7.5 to 8.5. The resulting solution is then extracted with methanol-chloroform (1:1) and desalicetin β-(4-aminosalicylate) free base is recovered from the solvent phase.

EXAMPLE 2

Upon substituting the 4-aminosalicylic acid added to the fermentation in Example 1 by the following carboxylic acids:

3,923,602

CH₃CH₂COOH

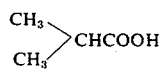

CH₃CH₂CH₂CH₂COOH
CH₃CH=CHCOOH
CH₃CH=CHCH=CHCOOH

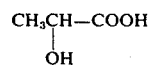

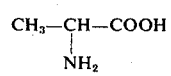

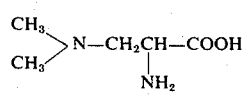

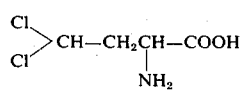

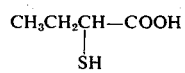

Anthranilic Acid
m-Aminobenzoic Acid
p-Aminobenzoic Acid
N-Methyl anthranilic Acid
p-Dimethylaminobenzoic Acid
p-Methylaminobenzoic Acid
p-Acetamidobenzoic Acid
Thiosalicylic Acid

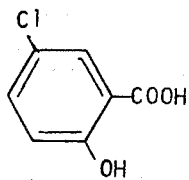

and,

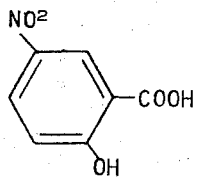

there are obtained the following compounds respectively:

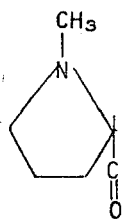

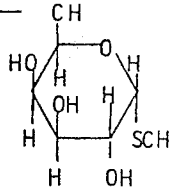

R =
CH₃CH₂—

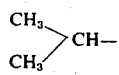

CH₃CH₂CH₂CH₂—
CH₃CH=CH—
CH₃CH=CHCH=CH—

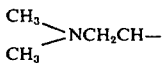

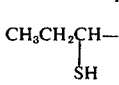

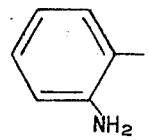

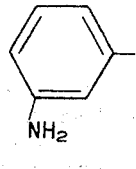

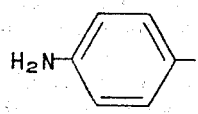

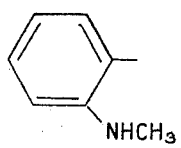

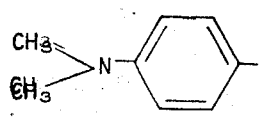

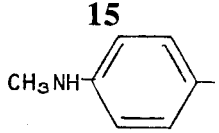

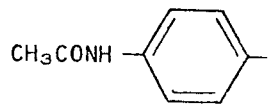

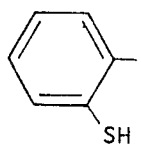

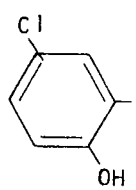

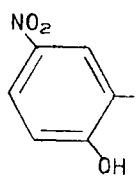

The above compounds can be isolated from the fermentation beer by employing the isolation techniques disclosed in Example 1, or obvious variations thereof.

These compounds, as well as the compounds of Example 1, exist in the free base or salt form as disclosed supra. The antibiotics are useful in both forms as antibacterial agents, primarily active against gram-positive bacteria. For example, these compounds are active against *Staphylococcus aureus* and *Streptococcus faecalis* and, thus, can be used to disinfect washed and stacked food utensils contaminated with these bacteria; they can also be used as disinfectants on various dental and medical equipment contaminated with *Staphylococcus aureus*.

Compounds of the formula

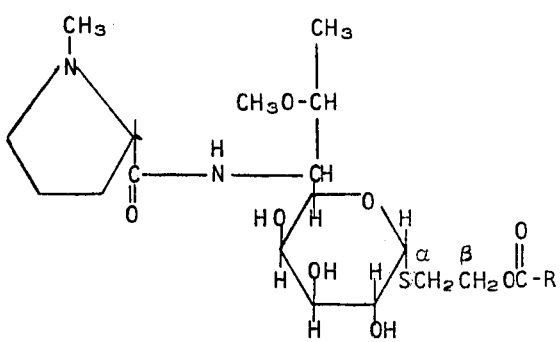

wherein R is

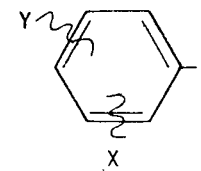

wherein X and Y are selected from the group consisting of H, R', —OH, —OCH₃, OR', —NH₂, NHR', NO, NO₂, —CHO, —CN, —COOH, —CH₂OH, —SO₃H, —SO₂NH₂, Cl, Br, I, F, —SH, and SR', R' is alkyl of not more than 8 carbon atoms, with the understanding that X and Y can be the same or different, and acid addition salts thereof, are considered to be particularly useful as antibiotics. This group of compounds is specifically exemplified by desalicetin β-(4-aminosalicylate) and its unexpected advantageous activity against the bacteria *M. avium*, *D. pneumoniae* and *S. lutia* as shown in the table following Example 1.

EXAMPLE 3 - 7-O-Demethyldesalicetin β-(4-aminosalicylate) - Formula IV

Part A. FERMENTATION

A soil stock of *Streptomyces caelestis* mutant 22227a, NRRL 5320, is grown under the fermentation conditions and media described in Example 1, Part A, to produce 7-O-demethyldesalicetin β-(4-aminosalicylate) and 7-O-demethylcelesticetin in the fermentation medium. These antibiotics are isolated and separated from each other using the procedures described hereinafter.

Part B. RECOVERY

Fermentation beer, obtained as described above, is harvested at 144 hours and filtered using diatomaceous earth as a filter aid. The filter cake is washed with 1 liter of water. The wash is combined with the clear filtrate (CB-W, 10 liters). The clear beer-wash is then passed over a column containing 5 ml. of Amberlite XAD-2 at a flow rate of 30 ml. per minute. The spent beet is collected as one fraction (SB). The column is then washed with 2 liters of water. The wash is collected as one fraction (W). The column is then eluted with methanol-water (95:5 v/v). Fractions are tested for bioactivity using sensitive *S. lutea* (ATCC 9341) as the assay organism. Results follow:

| Fraction | Zone (mm) |
|---|---|
| CB-W | 37 |
| SB | 15 |
| W | 12 |
| 95% MeOH | |
| 5 | 47 |
| 10 | 46 |
| 15 | 39 |
| 20 | 34 |
| 25 | 28.5 |
| 30 | 24 |
| 35 | 20.5 |
| 40 | 17.5 |
| 45 | 16 |

| Fraction | Zone (mm) |
|---|---|
| 50 | 0 |
| . | . |
| . | . |
| 95 | 0 |

Fractions 3–45 of the column eluates are concentrated to dryness to give Preparation ADA-8.1, 5.87 gms. Thin layer chromatography of this preparation shows the presence of 7-O-demethylcelesticetin and 7-O-demethyldesalicetin β-(4-aminosalicylate). These antibiotics are separated from each other by the silica gel chromatography using the procedures described in Example 1, Part B.

EXAMPLE 4 - N-Demethyldesalicetin
β-(4-aminosalicylate)-Forumla V and
N-demethyl-7-O-Demethyldesalicetin
β-(4-Aminosalicylate)-Formula VI Part A. FERMENTATION A soil stock of *Streptomyces caelestis* mutant 22218a, NRRL 5481, is grown under the fermentation conditions and media as described in Example 1, Part A, to produce the antibiotics N-demethyldesalicetin β-(4-aminosalicylate) and N-demethyl-7-O-demethyldesalicetin β-(4-aminosalicylate) with minor amounts of N-demethylcelesticetin and N-demethyl-7-O-demethylcelesticetin. These antibiotics are recovered from the fermentation beer and separated from each other by the procedures disclosed in Example 1, Parts B, C and D.

EXAMPLE 5

Upon substituting the 4-aminosalicylic acid added to the fermentations in Example 3 by the carboxylic acids disclosed in Example 2, there are obtained the compounds of Formula IV wherein the R group is as disclosed in Example 2. These compounds can be isolated from the fermentation beer by employing the isolation techniques disclosed in Example 1, or obvious variations thereof.

These compounds, as well as the compounds of Example 1, exist in the free base or salt form as disclosed supra. The antibiotics are useful in both forms as antibacterial agents, primarily active against gram-positive *Staphylococcus aureus* and *Streptococcus faecalis* and, thus, can be used to disinfect washed and stacked food utensils contaminated with these bacteria; they can also be used as disinfectants on various dental and medical equipment contaminated with *Staphylococcus aureus*.

EXAMPLE 6

Upon substituting the 4-aminosalicylic acid added to the fermentation in Example 4 by the carboxylic acids disclosed in Example 2, there are obtained the compounds of Formulae V and VI wherein the R group is as disclosed in Example 2.

These compounds can be isolated from the fermentation beer by employing the isolation techniques disclosed in Example 1, or obvious variations thereof.

These compounds, as well as the compounds of Example 1, exist in the free base or salt form as disclosed supra. The antibiotics are useful in both forms as antibacterial agents, primarily active against gram-positive bacteria. For example, these compounds are active against *Staphylococcus aureus* and *Streptococcus faecalis* and, thus, can be used to disinfect washed and stacked food utensils contaminated with these bacteria; they can also be used as disinfectants on various dental and medical equipment contaminated with *Staphylococcus aureus*.

We claim:

1. A process for preparing desalicetin β-acylates of the formula

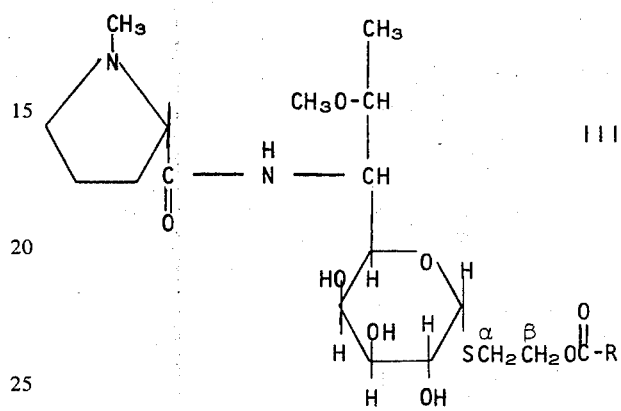

wherein R is selected from the group consisting of alkyl or alkylene of up to 12 carbon atoms; substituted alkyl or alkylene wherein the alkyl or alkylene is of up to 12 carbon atoms and the substitution group is selected from the group consisting of —OH, OR', —HN$_2$, —NHR', —NO$_2$, —SO$_3$H, —SO$_2$NH$_2$, —COOH, Cl, Br, I, F, —SH, and SR', and

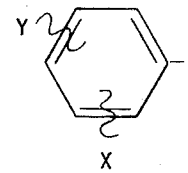

wherein X and Y are selected from the group consisting of H, R', —OH, —OCH$_3$, OR', NH$_2$, NHR', NO, NO$_2$, —CHO, —CN, —COOH, —CH$_2$OH, —SO$_3$H, —SO$_2$NH$_2$, Cl, F, Br, I, —SH, and —SR', wherein R' is alkyl of not more than 8 carbon atoms, and with the understanding that X and Y can be the same or different, which comprises the addition of an effective amount, ranging from about 0.5 gms. to about 5 gms. per liter of fermentation medium, of a carboxylic acid selected from the group consisting of saturated and unsaturated, substituted and unsubstituted aliphatic acids of from 2 to 12 carbon atoms, inclusive; substitutions of the aliphatic acids can be —OH, OR', —NH$_2$, —NHR', —NO$_2$, —SO$_3$H, —COOH, Cl, F, Br, I, —SH, SR', monosubstituted and disubstituted aromatic acids of the general formula

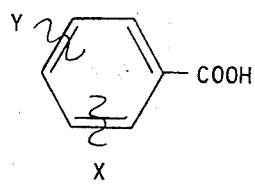

wherein X and Y are selected from the group consisting of R', —OH, —OCH₃, OR', NH₂, NHR', NO, NO₂, —CHO, —CN, —COOH, —CH₂OH, —SO₃H, —SO₂NH₂, Cl, F, Br, I, —SH, and —SR', wherein R' is alkyl of not more than 8 carbon atoms, to a *Streptomyces caelestis* celesticetin fermentation being conducted in an aqueous nutrient medium under aerobic conditions.

2. A process, according to claim 1, wherein said celesticetin fermentation employs the microorganism *Streptomyces caelestis*, having the identifying characteristics of culture deposit NRRL 2418, and mutants or variants thereof capable of producing celesticetin.

3. A process, according to claim 1, which comprises isolating the desalicetin β-acylate from the fermentation broth.

4. A process for preparing desalicetin β-(4-aminosalicylate) which comprises adding an effective amount of 4-aminosalicylic acid to a *Streptomyces caelestis* fermentation being conducted in an aqueous nutrient medium under aerobic conditions.

5. A process, according to claim 4, wherein the effective amount of 4-aminosalicylic acid is about 2 gms. per liter of fermentation medium.

6. A process, according to claim 4, wherein the desalicetin β-(4-aminosalicylate) is isolated from the fermentation broth.

7. A process, according to claim 4, wherein the *Streptomyces caelestis* microorganism has the cultural characteristics of culture deposit NRRL 2418.

8. A process for preparing 7-O-dimethyldesalicetin β-acylates of the formula:

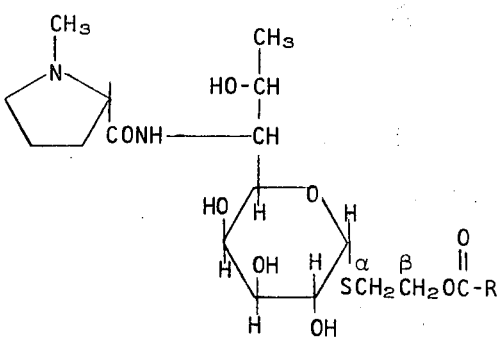

IV wherein R is selected from the group consisting of alkyl or alkylene of up to 12 carbon atoms; substituted alkyl or alkylene wherein the alkyl or alkylene is of up to 12 carbon atoms and the substitution group is selected from the group consisting of —OH, OR', —NH₂, —NHR', —NO₂, —SO₃H, —SO₂NH₂, —COOH, Cl, Br, I, F, —SH, and SR', and

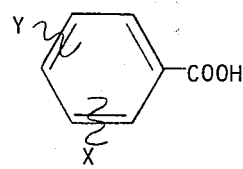

wherein X and Y are selected from the group consisting of H, R', —OH, —OCH₃, OR', NH₂, NHR', NO, NO₂, —CHO, —CN, —COOH, —CH₂OH, —SO₃H, —SO₂NH₂, Cl, F, Br, I, —SH, and —SR', wherein R' is alkyl of not more than 8 carbon atoms, and with the understanding that X and Y can be the same or different, which comprises the addition of an effective amount, ranging from about 0.5 gms. to about 5 gms. per liter of fermentation medium of a carboxylic acid selected from the group consisting of saturated and unsaturated, substituted and unsubstituted aliphatic acids of from 2 to 12 carbon atoms, inclusive; substitutions of the aliphatic acids can be —OH, OR', —NH₂, —NHR', —NO₂, —SO₃H, —COOH, Cl, F, Br, I, —SH, SR', monosubstituted and disubstituted aromatic acids of the general formula

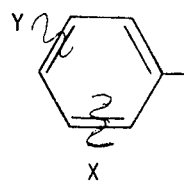

wherein X and Y are selected from the group consisting of R', —OH, —OCH₃, OR', NH₂, NO, NO₂, —CHO, —CN, —COOH, —CH₂OH, —SO₃H, —SO₂NH₂, Cl, F, Br, I, —SH, and —SR', wherein R' is alkyl of not more than 8 carbon atoms to a *Streptomyces caelestis*-7-O-demethylcelesticetin fermentation being conducted in an aqueous nutrient medium under aerobic conditions 9. A process, according to claim 8, wherein 7-O-demethylcelesticetin fermentation employes the microorganism *Streptomyces caelestis* mutant 22227a, having the identifying characteristics of culture deposit NRRL 5320.

10. A process, according to claim 8, which comprises isolating the 7-O-demethyldesalicetin β-acylate from the fermentation broth.

11. A process for preparing 7-O-demethyldesalicetin β-(4-aminosalicylate) which comprises adding an effective amount of 4-aminosalicylic acid to a *Streptomyces caelestis* mutant 22227a, NRRL 5320, fermentation being conducted in an aqueous nutrient medium under aerobic conditions.

12. A process, according to claim 11, wherein the 7-O-demethylcelesticetin β-(4-aminosalicylate) is isolated from the fermentation broth.

13. A process for preparing N-demethyldesalicetin β-acylates of the formula:

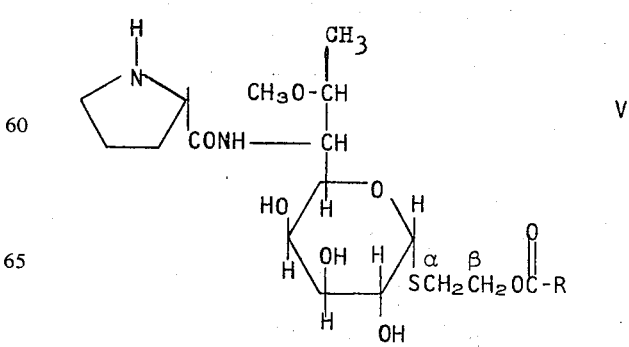

V wherein R is selected from the group consisting of alkyl or alkylene of up to 12 carbon atoms; substituted alkyl or alkylene wherein the alkyl or alkylene is of up to 12 carbon atoms and the substitution group is selected from the group consisting of —OH, OR', —NH₂, —NHR', —NO₂, —SO₃H, —SO₂NH₂, —COOH, Cl, Br, I, F, —SH, and SR', and

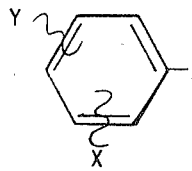

wherein X and Y are selected from the group consisting of H, R', —OH, —OCH₃, OR', NH₂, NHR', NO, NO₂, —CHO, —CN, —COOH, —CH₂OH, —SO₃, —SO₂NH₂, Cl, F, Br, I, —SH, and —SR', wherein R' is alkyl of not more than 8 carbon atoms, and with the understanding that X and Y can be the same or different, which comprises the addition of an effective amount, ranging from about 0.5 gms. to about 5 gms. per liter of fermentation medium, of a carboxylic acid selected from the group consisting of saturated and unsaturated, substituted and unsubstituted aliphatic acids of from 2 to 12 carbon atoms, inclusive; substitutions of the aliphatic acids can be —OH, OR', —NH₂, —NHR', —NH₂, —SO₃H, —COOH, Cl, F, Br, I, —SH, SR', monosubstituted and disubstituted aromatic acids of the general formula

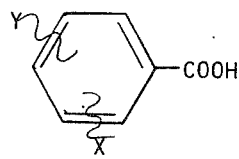

wherein X and Y are selected from the group consisting of R', —OH, —OCH₃, OR', NH₂, NHR', NO, NO₂, —CHO, —CN, —COOH, —CH₂ OH, —SO₃H, —SO₂NH₂, Cl, F, Br, I, —SH, and —SR', wherein R' is alkyl of not more than 8 carbon atoms, to a *Streptomyces caelestis* N-demethylcelesticetin fermentation being conducted in an aqueous nutrient medium under aerobic conditions.

14. A process, according to claim 13, wherein said N-demethylcelesticetin fermentation employes the microorganism *Streptomyces caelestis* mutant 22218a, having the identifying characteristics of culture deposit NRRL 5481.

15. A process, according to claim 13, which comprises isolating the N-demethyldesalicetin β-acylate from the fermentation broth.

16. A process for preparing N-demethyldesalicetin β-(4-aminosalicylate) which comprises adding an effective amount of 4-aminosalicylic acid to a *Streptomyces caelestis* mutant 22218a, NRRL 5481, fermentation being conducted in an aqueous nutrient medium under aerobic conditions.

17. A process, according to claim 16, wherein the N-demethyldesalicetin β-(4-aminosalicylate) is isolated from the fermentation broth.

18. A process for preparing N-demethyl-7--O-demethyldesalicetin β-acylates of the formula

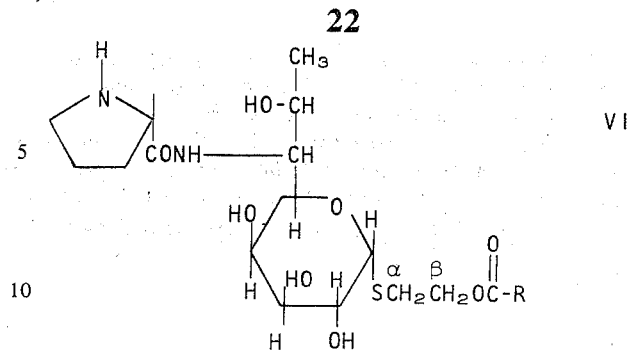

wherein R is selected from the group consisting of alkyl or alkylene of up to 12 carbon atoms; substituted alkyl or alkylene wherein the alkyl or alkylene is of up to 12 carbon atoms and the substitution group is selected from the group consisting of —OH, OR', —NH₂, —NHR', —NO₂, —SO₃H, —SO₂NH₂, —COOH, Cl, Br, I, F, —SH, and SR', and

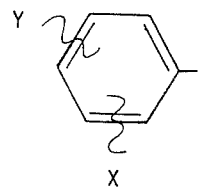

wherein X and Y are selected from the group consisting of H, R', —OH, —OCH₃, OR', NH₂, NHR', NO, NO₂, —CHO, CN, —COOH, —CH₂OH, —SO₃H, —SO₂NH₂, Cl, F, Br, I, —SH, and —SR', wherein R' is alkyl of not more than 8 carbon atoms, and with the understanding that X and Y can be the same or different, which comprises the addition of an effective amount, ranging from about 0.5 gms. to about 5 gms. per liter of fermentation medium of a carboxylic acid selected from the group consisting of saturated and unsaturated, substituted and unsubstituted aliphatic acids of from 2 to 12 carbon atoms, inclusive; substitutions of the aliphatic acids can be —OH, OR', —NH₂, —NHR', —NO₂, —SO₃H, —COOH, Cl, F, Br, I, —SH, Sr', monosubstituted and disubstituted aromatic acids of the general formula

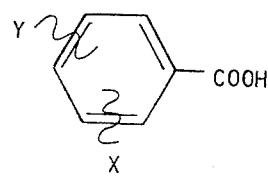

wherein X and Y are selected from the group consisting of R', —OH, —OCH₃, OR', NH₂, NHR', NO, NO₂, —CHO, —CN, —COOH, —CH₂OH, —SO₃H, —SO₂NH₂, Cl, F, Br, I, —SH and —SR', wherein R' is alkyl of not more than 8 carbon atoms, to a *Streptomyces caelestis*-N-demethyl -7-O-demethylcelesticetin fermentation being conducted in an aqueous nutrient medium under aerobic conditions.

19. A process, according to claim 18, wherein said N-demethyl-7-O-demethylcelesticetin fermentation employes the microorganism *Streptomyces caelestis* mutant 22218a, having the identifying characteristics of culture deposite NRRL 5481.

20. A process, according to claim 18, which comprises isolating the N-demethyl-7-O-demethylcelesticetin β-acylate from the fermentation broth.

21. A process for preparing N-demethyl-7-O-demethyldesalicetin β-(4-aminosalicylate) which comprises adding an effective amount of 4-aminosalicylic acid to a Streptomyces caelestis mutant 22218a, NRRL 5481, fermentation being conducted in an aqueous nutrient medium under aerobic conditions.

22. A process, according to claim 21, wherein the N-demethyl-7-O-demethyldesalicetin β-(4-aminosalicylate) is isolated from the fermentation broth.

* * * * *

UNITED STATES PATENT AND TRADEMARK OFFICE
CERTIFICATE OF CORRECTION

PATENT NO. : 3,923,602
DATED : December 2, 1975
INVENTOR(S) : Alexander D. Argoudelis, John H. Coats, and LeRoy E. Johnson It is certified that error appears in the above-identified patent and that said Letters Patent are hereby corrected as shown below:

Column 2, line 30, for "222218a" read -- 22218a --; line 66, for "Vi" read -- VI --. Column 3, line 13, for "x" read -- X --; line 15, for "-CH" read -- -CN --. Column 4, line 26, for "a" read -- an --; line 37, for "liquour" read -- liquor --.
Column 8, line 10, first table,
for "Fraction No.   Zone (mm) " read -- Fraction No.   Zone(mm) --

Column 9, line 17, for "Results follow: j" read -- Results follow: --. Column 12, line 31, for "of" read -- or --; line 50, for "S. Lutea" read -- S. lutea --. Column 14, lines 22-23, for $$\begin{matrix} Cl \\ Cl \end{matrix} \!\! > \!\! CHCH_2CH\text{-} \\ \quad\quad\quad NH_2$$

read --

$$\begin{matrix} Cl \\ Cl \end{matrix} \!\! > \!\! CHCH_2CH\text{-} \\ \quad\quad\quad\quad | \\ \quad\quad\quad NH_2$$  --.

Column 16, line 24, for "S. lutia" read -- S. lutea --.
Column 21, Claim 13, line 19, for "-SO₃, -SO₂NH₂" read -- -SO₃H, -SO₂NH₂ --; line 44, Claim 18, for "Sr'" read -- SR' --. Column 22, line 68, claim 19, for "deposite" read -- deposit --.

Signed and Sealed this sixth Day of April 1976

[SEAL]

Attest:

RUTH C. MASON
*Attesting Officer*

C. MARSHALL DANN
*Commissioner of Patents and Trademarks*